Oct. 6, 1931.   B. L. BROOKS   1,826,271
ARTIFICIAL TOOTH
Filed July 8, 1926
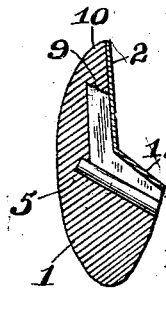 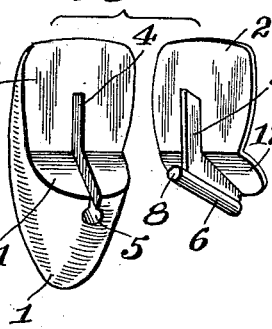 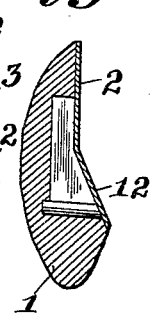 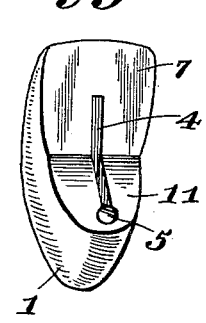
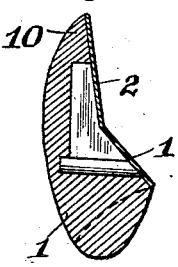 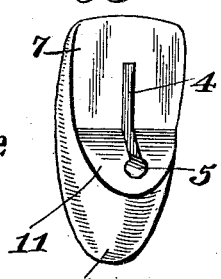 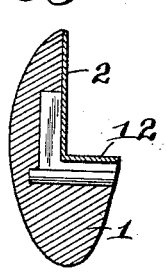 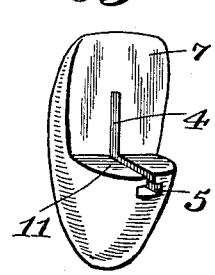
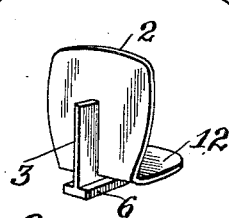
Inventor
Benjamin L. Brooks Patented Oct. 6, 1931

1,826,271

UNITED STATES PATENT OFFICE

BENJAMIN L. BROOKS, OF LYNCHBURG, VIRGINIA

ARTIFICIAL TOOTH

Application filed July 8, 1926. Serial No. 121,208.

This invention relates to removable interchangeable porcelain facings having porcelain root extensions with the root end portions somewhat rounded.

The root end surface is ordinarily glazed and adapted for dummies and pontics of dental bridgework. The glazed end portion is intended to fit up flush to the tissue of the alevolar ridge or somewhat into the root socket alevolar ridge thereby forming and producing a more natural and sanitary arrangement which approaches closely to the anatomical tooth form at the point of the gum line and the alevolar ridge.

An object of this invention is to provide a slot or recess extending into the lingual surface of the porcelain facing and root portion into which a pin or attaching device is placed for the purpose of cementing with a dental cement to secure the porcelain facing to the pin attaching device. The pin attaching device is preferably attached to a metal backing or cusp plate by means of attaching, known to the metal arts. The metal backing is made adaptable to the cut away lingual and occlusal surfaces of the porcelain root facing and upon this metal locking cut away surface is provided a recess for adding additional metal to each surface to strengthen the backing for stresses as a means for attaching the dummies or pontics or abutment pieces together to form the span portion of metal backing common to fixed dental bridgework.

Another object of this invention is to provide a pin arrangement or attaching device which will slide into the slot or recess of the porcelain facing and root portion and around which is adapted to be placed dental cement for securing the porcelain facing or root to the pin and thereby to the dental bridge, the pin attaching device being adapted to be secured to the metal backing common to dental bridgework.

A further object of this invention is to provide an interchangeable or replacement feature which can be done while the bridge is fastened or placed in the mouth without removing the same from the mouth. This is made possible by the arrangement of the slot in the porcelain facing and root portion together with the manner and position of the pin attaching device which has been made a part of the metal backing of the bridge, which backing serves as the abutment span or support.

The slot in the porcelain faced tooth enters from the lingual side. The pin from the attaching device projects from the metal backing toward the labial or buccal surface in such a manner as to allow the porcelain facing root to slip back on the pin toward the lingual at about right angles to the long axis of the tooth facing, or slanting upwardly and backward.

A further object of this invention is to provide a two surface reciprocal anchorage for pontic artificial teeth arranged in such a manner as to strengthen and give support to the labial upright face against lateral and downward pressures.

A further object of this invention is to provide an upright boxed labial mortise in the porcelain to receive an upright labial plate on the metal backing.

Further objects of this invention will appear from the following detailed description of this device and as disclosed in the single sheet of drawings which is herewith made a part of this application.

In the drawings,

Fig. 1 represents a vertical sectional view of an anterior tooth and root facing showing the pin or attaching device mounted with gold backing and inserted in the tooth.

Fig. 2 illustrates a perspective view of Fig. 1 showing the pin construction on the backing of the attaching device.

Fig. 3 represents a vertical sectional view of a tooth and root facing with its pin or attaching device mounted thereon of a slightly modified form over Fig. 1.

Fig. 4 represents a perspective view of Fig. 3, with the pin and backing removed and showing the slot and tooth surface arrangement on the tooth and root facing.

Fig. 5 represents a vertical sectional view of a tooth and root facing with pin attaching device mounted thereon in slightly modified form over Fig. 1.

Fig. 6 represents a perspective view of Fig.

5 with the pin and its backing removed therefrom.

Fig. 7 illustrates a vertical sectional view of a modified form of anterior tooth and root facing showing a pin and backing mounted therein.

Fig. 8 represents a perspective view of Fig. 7 with the pin and backing removed.

Fig. 9 represents a perspective view of the pin and backing adapted to be used in connection with the anterior tooth and root facing disclosed in Figs. 7 and 8.

Numeral 1 designates a porcelain face and rooted tooth adapted particularly to the anterior ridge of the mouth, while numeral 2 designates the gold backing having a pin 3 attached thereto by some suitable means, the backing 2 and pin 3 being integrally joined and adapted to be mounted in place on the porcelain faced tooth 1 in a receiving slot or recess 4 having a specially formed base portion 5 adapted to receive a cooperating base section 6 of the pin 3. The base portions 5 and 6 of the slot and pin may be made to conform to any desired shape approximately rounded as disclosed in Figs. 1 to 6 inclusive or having rectangular shape as disclosed in Figs. 7, 8 and 9. The lingual and occlusal or upper portions of the tooth 7 are adapted to be cut away and ground to allow the interchangeable gold mounting 2 having the attaching pin 3 with its base portion 6 integrally connected thereto. The pin attaching device 3 and 6 is adapted for insertion into slots 4 and 5 of the porcelain tooth 1, the attaching pin 3 and 6 being formed preferably having a flat upright portion with parallel sides, the forward end of the base portion and of the pin 6 being adapted to extend a short distance beyond the forward edge of the upright flat portion of the pin as at 8. The base portion of the slot 5 is so formed as to provide a strong grip, particularly into the greater porcelain bulk at approximately right angles to the occlusal stress on the porcelain. That part of the slot 4 extending upward of the long axis of the tooth has approximately parallel walls and a boxed or dovetailed recess 9 toward the cutting edge of the tooth 10, the upright slot portion 4 in the tooth being adapted to receive the upright pin portion 3 on the metal backing 2. By this invention, two surfaces 7 and 11, are formed in the porcelain tooth to receive the two cooperating surfaces 2 and 12 of the metal backing, thereby providing a two-surface reciprocal anchorage in cooperation with the strengthening qualities of the pin 3 and its portions 6, 8 and 9.

One of the most important points in connection with a pontic tooth is the mechanical and porcelain adaptation. The means of attaching the porcelain pontics must be simple, and give strength where strength is most desired. It also must lend itself to the widest range of application. The great problem with the manufacturers of teeth is to find a tooth that is simple, easy to make, and possessing mechanical and adaptable qualities. Although the various means of attaching these teeth must be similar, yet, the fine variations are very important and are the very soul of the whole problem. Certainly the adaptability and strength of body are the points most important. The porcelain form imitates the natural tooth and conceals as much of the metal backing as possible, for esthetic reasons, principally. The porcelain itself is a kind of veneer and has little strength. It is hard and brittle and must be protected and supported by a strong metal which will protect it from direct contact with force in chewing, as much as possible. The metal must also serve to attach this tooth to the natural teeth in the mouth and to form the main portion in bridge work.

This invention provides a two surface reciprocal anchorage particularly adapted for pontics in artificial teeth, and improved means for applying porcelain facings with attached rounded glazed root ends to the gold or other metal backing in dental bridgework, particularly a pin engaging device for the purpose of retaining the porcelain facing to the bridge or backing. The slot in the porcelain facing root is so arranged that the base slot portion enters at the lingual side, preferably in the bulky portions of the porcelain and extending about at right angles to the long axes of the tooth into and at a point close to the labial and buccal surfaces but not through, thereby providing a recess slightly beyond that portion of the slot that receives the upright labial support flange. The portion of the slot forming the top or occlusal end of the mortise is to be formed having a boxed recess in the porcelain body into which the labial flange of the metal surface extends to serve as additional strengthening and supporting means for lateral stress particularly. Excessive stress on all porcelain facings is lateral and upward, and this invention provides a means for strengthening and tying the elements together in such a manner as to relieve the material of lateral and upward strain at the weak point, which is located at the junction of the cutting edge of the porcelain and metal backing. The base of the slot is broader and larger with an extending recess in the labial and buccal bulk of the porcelain than the upright portion of the slot, this portion may be either round or of any desired shape. The base portion of the slot is so formed by this invention as to provide a strong grip, particularly into the greater porcelain bulk at approximately right angles to the occlusal stress on the porcelain which it is designed to bear. That portion of the slot extending upward with the long axis of the tooth has approximately parallel walls and a recess toward the cutting edge of the tooth. The upright slot portion is adapted to receive the upright flange of the metal attachment thus giving still greater grip to the porcelain when cemented. The upright metal flange of the pin serves to function as a brace to the base portion of the pin and to give reciprocal anchorage for the tooth. It is to be understood that the metal pin attaching device and its mounting may be modified slightly in order to conform to posterior teeth.

This invention is susceptible to those modifications which would be obvious to workers in dental and ceramic art without in any way departing from the scope and purpose of this invention, as for example, to make up the metal pin attachment device mounted permanently to the thin metal backing to conform to the cut away and occlusal surfaces of the porcelain or without this backing but with the pin extending slightly out of the slot to allow an inset of the pin for the backing in any way suitable to the art. Obviously, the pin attaching device is made of a suitable metal and is formed to fit into the slot arranged in the porcelain portion allowing room for interposing the dental cement for securing purposes.

This invention provides a two-surface reciprocal anchorage for artificial teeth comprising a porcelain facing having a root or base extension somewhat rounded or egg shape with or without the ridge lingual portion sliced off to allow the root end to saddle over or conform to the dental ridge, the porcelain facing or base having a round or rectangular bore in its lingual base extending forwardly, a boxed like slot extending into the face of the porcelain, the slot being thinner than the base bore, the lateral walls of the slot being approximately parallel the labial incisal portion of the slot being a boxed like undercut having its top plane corresponding to the direction of the base bore as disclosed particularly in Fig. 7, the base and slot entering on the lingual side and extending forwardly in the face and bulky portion of the porcelain approximately at a right angle to the face of the tooth, or as disclosed in Fig. 1 cylindrically from the root lingual side upwardly toward the face incisal side at an angle of about 120 degrees diverging to the face of the tooth. The pin and labial flange tongue of the backing being formed to be received into the bore and slot, the backing to conform to the two lingual surface planes of the percelain.

This invention provides an artificial porcelain faced tooth having a rounded root end adapted for dummies and pontics in dental bridgework and is reciprocal or interchangeable in case of fracture and breakage or for the purpose of grinding, fitting, adding to glazing or changing color while the bridge is either in or out of the mouth.

What I claim is:

In an artificial tooth, an anchorage comprising a facing having a root extension, two surfaces on the lingual side, a metal backing to fit thereon, a base surface extending from the lingual side approximately at right angles to the long axis of the tooth toward the labial and buccal surfaces and adapted to merge with a second surface extending from the incisal edge toward the root end thereby forming an angle having two surfaces at approximately right angles to each other, the base surface and second surface having a slot therein adapted to receive a tongue portion of the backing.

In testimony whereof I affix my signature.

BENJAMIN L. BROOKS.